US 9,158,527 B2

(12) United States Patent
Son

(10) Patent No.: US 9,158,527 B2
(45) Date of Patent: Oct. 13, 2015

(54) UPGRADE SYSTEM AND METHOD HAVING ADAPTIVE CHANGEABLE UPGRADE PROCESS

(75) Inventor: Young-su Son, Incheon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 13 days.

(21) Appl. No.: 13/474,171

(22) Filed: May 17, 2012

(65) Prior Publication Data

US 2013/0086231 A1 Apr. 4, 2013

(30) Foreign Application Priority Data

Sep. 30, 2011 (KR) .......................... 10-2011-0100035

(51) Int. Cl.
*G06F 15/16* (2006.01)
*G06F 9/445* (2006.01)
*H04L 29/08* (2006.01)

(52) U.S. Cl.
CPC .... *G06F 8/65* (2013.01); *H04L 67/26* (2013.01); *H04L 67/325* (2013.01); *H04L 67/34* (2013.01)

(58) Field of Classification Search
USPC .......................................................... 709/203
See application file for complete search history.

(56) References Cited

U.S. PATENT DOCUMENTS

| | | | | |
|---|---|---|---|---|
| 8,065,712 B1* | 11/2011 | Cheng et al. .................... 726/1 |
| 8,407,682 B2* | 3/2013 | Reisman ....................... 717/168 |
| 8,521,783 B2* | 8/2013 | Corbea et al. .................. 707/793 |
| 8,549,527 B2* | 10/2013 | Bagheri et al. ................. 718/103 |
| 2005/0257215 A1* | 11/2005 | Denby et al. .................. 717/172 |
| 2005/0278415 A1* | 12/2005 | Corbea et al. ................. 709/202 |
| 2008/0163227 A1 | 7/2008 | Son et al. |
| 2010/0125851 A1* | 5/2010 | Singh et al. .................... 718/104 |
| 2011/0041003 A1* | 2/2011 | Pattar et al. ..................... 714/4.3 |
| 2011/0067023 A1* | 3/2011 | Chiyo et al. .................... 717/177 |
| 2011/0137489 A1* | 6/2011 | Gilleland et al. ................ 701/2 |
| 2011/0201365 A1* | 8/2011 | Segura .......................... 455/466 |
| 2012/0254944 A1* | 10/2012 | Kamat et al. ...................... 726/3 |
| 2013/0198157 A1* | 8/2013 | Goping .......................... 707/705 |

FOREIGN PATENT DOCUMENTS

KR 10-2008-0060927 7/2008

OTHER PUBLICATIONS

Half-Push/Half-Polling Jinho Jang, Jemin Jeon, Youngsu Son, Sangwon Ko, Hyukjoon Lee, Junsun Kim Hanyang University, PLoP'09, Aug. 28-30 Chicago, IL, USA. Copyright 2009 is held by the author(s). ISBN: 978-1-60558-873-5.*

* cited by examiner

*Primary Examiner* — Tauqir Hussain
(74) *Attorney, Agent, or Firm* — Staas & Halsey LLP

(57) ABSTRACT

An upgrade system, an upgrade type of which may be adaptively changed, and an upgrade method includes a server, an upgrade type of which may be adaptively changed, a client, an upgrade type of which may be adaptively changed, and a ticket controlling apparatus. The server includes: a server interface unit receiving information relating to an upgrade from a ticket controlling apparatus comprising a ticket; a pushing unit in which at least one client to be upgraded is registered; and a pushing scheduling unit connecting to the ticket controlling apparatus, receiving the information relating to the upgrade from the server interface unit, and scheduling an upgrade of the at least one client by using the pushing unit based on the received information relating to the upgrade. The ticket comprises information about a distribution strategy, information about the upgrade type, and information about a module to be distributed.

18 Claims, 7 Drawing Sheets

UPGRADE SYSTEM AND METHOD HAVING ADAPTIVE CHANGEABLE UPGRADE PROCESS

CROSS-REFERENCE TO RELATED PATENT APPLICATION

This application claims the benefit of Korean Patent Application No. 10-2011-0100035, filed on Sep. 30, 2011, in the Korean Intellectual Property Office, the disclosure of which is incorporated herein in its entirety by reference.

BACKGROUND

1. Field

Example embodiments of the following description relate to an upgrade system and method having adaptive changeable upgrade processes, and more particularly, to an upgrade system and method capable of changing an upgrade process into a push type, a polling type, and half-push/half-polling type upgrade without configuring an additional system.

2. Description of the Related Art

Recently, the client/server model has been a principle model for conception of network computing. Most business programs that have been made recently adopt the client/server model, and so does TCP/IP, which is a dominant protocol for data communications on the Internet. For example, in the case of the Internet, a web browser may be considered as a kind of client program that requests a Web server at a certain location in the Internet to transmit Web pages or files. In a general client/server model, a server program that is generally referred to as daemon waits for requests of a client in an activated state, and a plurality of client programs generally share one server program.

In the client/server model, data transmission is generally performed in a polling type, a push type, and half-push/half-polling type.

According to the polling type data transmission, clients regularly check the version of a module of the server, and download upgrade files for upgrading the module from the server, when the version of the module on the server is updated.

According to the push type data transmission, the server visits an IP address of a client based on client information managed by the server and transmits data directly to the client according to options set by the client. That is, the server manages the version of the module of the client and selects the client module to be upgraded, and then, notifies the client that the module is to be upgraded.

In order to address problems of the polling type or the push type data transmissions, the half-push/half-polling type data transmissions has been suggested. For example, according to the half-push/half-polling type data transmission, the push and the polling type data transmissions are combined appropriately to support the upgrade of the client so that the client may perform the upgrade by using update time distribution of the server and a scheduling method.

SUMMARY

The present disclosure provides a server having an adaptively changeable upgrade process.

According to an aspect, the server may comprise a server interface unit receiving information relating to an upgrade from a ticket controlling apparatus comprising a ticket, a pushing unit, in which at least one client to be upgraded is registered and a pushing scheduling unit connecting to the ticket controlling apparatus, receiving the information relating to the upgrade from the server interface unit, and scheduling an upgrade of the at least one client by using the pushing unit based on the received information relating to the upgrade. The ticket may comprise information about a distribution strategy, information about the upgrade type, and information about a module to be distributed.

The present disclosure also provides a client having an adaptively changeable upgrade process.

According to an aspect, a client, an upgrade type of which may be adaptively changed, may comprise a client adaptor for controlling a connection to a server, a polling unit for downloading a module from the server and a polling scheduling unit connecting to a ticket controlling apparatus comprising a ticket, receiving information relating to an upgrade provided from the ticket controlling apparatus, and scheduling an upgrade of the client by using the polling unit based on the received information relating to the upgrade. The ticket may comprise information about a distribution strategy, information about an upgrade type, and information about a module to be distributed.

According to an aspect, there is provided a ticket controlling apparatus used between a server and a client in order to adaptively change an upgrade type. The apparatus may comprise a ticket storage unit for storing a ticket comprising information about the ticket and a ticket management unit analyzing the information about the ticket stored in the ticket storage unit, and generating a channel between the server and the client based on the analyzed information. The ticket may comprise information about a distribution strategy, information about an upgrade type, and information about a module to be distributed.

According to another aspect, there is provided a method of adaptively changing an upgrade type in a server. The method may comprise connecting to a ticket controlling apparatus comprising a ticket, receiving information relating to an upgrade from the ticket controlling apparatus, registering at least one client that is to be upgraded, and scheduling the upgrade of the registered client based on the received information relating to the upgrade. The ticket may comprise information about a distribution strategy, information about the upgrade type, and information about a module to be distributed.

According to another aspect, there is provided a method of adaptively changing an upgrade type in a client. The method may comprise connecting to a server, connecting to a ticket controlling apparatus comprising a ticket, receiving information relating to an upgrade from the ticket controlling apparatus, and generating an upgrade schedule based on the information relating to the upgrade. The ticket may comprise information about a distribution strategy, information about the upgrade type, and information about a module to be distributed.

According to another aspect, there is provided a method of adaptively changing an upgrade type in a ticket controlling apparatus comprising a ticket. The method may comprise connecting to a server and at least one client, and analyzing information about the ticket, and generating a channel between the server and the at least one client based on the analyzed information. The ticket may comprise information about a distribution strategy, information about the upgrade type, and information about a module to be distributed.

According to another aspect, there is provided a computer-readable recording medium having embodied thereon a computer program for executing the above-mentioned method.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
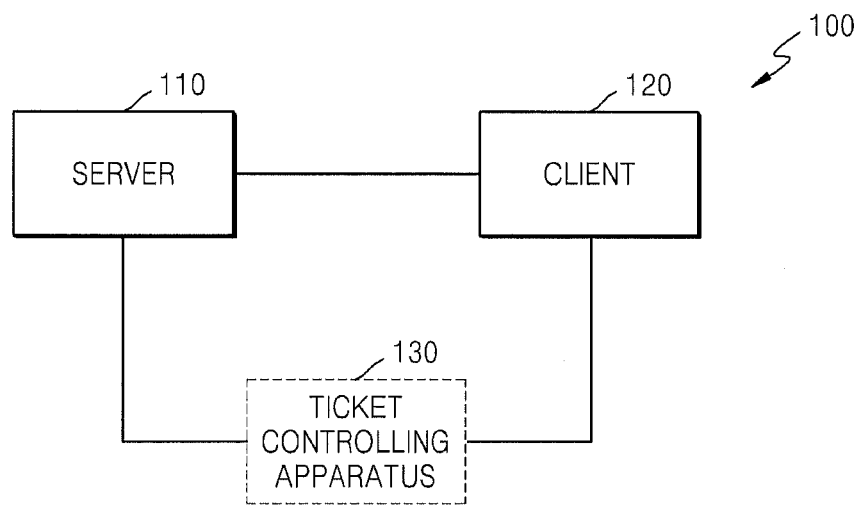
FIG. 1 is a block diagram showing an upgrade system, an upgrade type of which may be adaptively changed, according to an embodiment.

Reference will now be made in detail to example embodiments, examples of which are illustrated in the accompanying drawings, wherein like reference numerals refer to the like elements throughout. Example embodiments are described below to explain the present disclosure by referring to the figures.

General data transmission methods between a client and a server may include a polling type upgrade, a push type upgrade, and a half-push/half-polling type upgrade. Conventional upgrade systems have realized upgrade systems of the polling type, the push type, and the half-push/half-polling type according to circumstances. That is, conventional upgrade systems have realized additional systems to perform the upgrade of the push type, the polling type, and the half-push/half-polling type. However, according to various types of recent devices, a certain module (for example, a security-related module) has to be transmitted rapidly from the server to the client in the push type transmission, and another module has to be provided in the polling type upgrade so that the clients may selectively download the module. In addition, in the case of a building management system (BEMS), changes of a module relating to security have to be rapidly transferred in the push type transmission; however, an update of a printer driver in an office may not be urgent.

In particular, according to the polling type data transmission, since the clients regularly check versions of modules in the server, overload may apply to both of the server and the clients. In addition, all the clients have to maintain the same module versions.

Otherwise, according to the push type data transmission, the module upgraded by the client may not be possible when an electric power is turned off during the upgrading or when operations of the client have terminated during upgrading. In addition, the server has to manage all of the clients and regularly check a certain client. Also, the push type upgrade may only be applied to a case where Internet protocol (IP) addresses of the clients are fixed.

The present disclosure provides an upgrade system and an upgrade method capable of flexibly changing an upgrade type to the push type, the polling type, or the half-push/half-polling type. In addition, the upgrade system and method may easily support various upgrade types other than the push, the polling, and the half-push/half-polling types.

However, the objective is not limited to the above description, and other objectives that are not recited here may be clearly comprehended by one of ordinary skill in the art from the following descriptions.

Hereinafter, embodiments will be described in detail.

FIG. 1 is a block diagram showing an upgrade system 100, an upgrade type of which may be adaptively changed, according to an embodiment. The upgrade system 100 may include a server 110, an upgrade type of which may be adaptively changed, a client 120, an upgrade type of which is adaptively changed, and a ticket controlling apparatus 130. The ticket controlling apparatus 130 may be a part of the server 110 or the client 120, or may be an additional independent apparatus.

Figure 2:
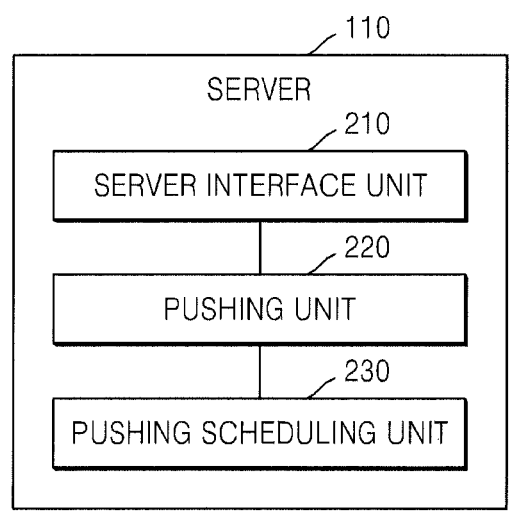
FIG. 2 is a block diagram showing a server of FIG. 1, according to an embodiment.

FIG. 2 is a block diagram showing the server 110 of FIG. 1, according to an embodiment.

The server 110, the upgrade type of which may be adaptively changed, may include a server interface unit 210, a pushing unit 220, and a pushing scheduling unit 230. The server interface unit 210 may receive information about upgrade (for example, upgrade of a module) performed by the client from the ticket controlling apparatus 130 including a ticket 420. At least one client 120 that is an upgrade target may be registered in the pushing unit 220. The pushing scheduling unit 230 may be connected to the ticket controlling apparatus 130, may receive information relating to the upgrade from the server interface unit 210, and may schedule the upgrade of at least one client 120 by using the pushing unit 220 based on the received information relating to the upgrade. The ticket 420 may refer to a list of functions or a list of files, which may include information about distribution strategy, information about upgrade type, and information about a module to be distributed. The ticket 420 may be useful in managing information about files in the server 110 and the client 120 and set user information. The upgrade of the client 120 may be performed while varying the distribution type and the distribution strategy depending on a system environment and circumstance by using the ticket 420, and thus, the overload of the server 110 may be prevented and the client 120 may be upgraded at low costs.

The information about the upgrade may include information about the distribution strategy determined by the ticket controlling apparatus 130, information about the upgrade type determined by the ticket controlling apparatus 130, and information about the module to be distributed. The distribution strategy may be classified, for example, as a broadcasting type that distributes modules simultaneously to all of the clients 120, a staged type that distributes modules to groups of clients 120 by group units, and a time reservation type that sets distribution time and distributes the modules at the set time. The upgrade type may include the module distribution type including, for example, the push type, the polling type, and the half-push/half-polling type.

The server interface unit 210 may notify at least one client 120 of information about the upgrade.

In addition, the determined information may include information about one of the broadcasting type, the staged type, and the time reservation type selected by the ticket controlling apparatus 130. The determined information about the upgrade type may include, for example, information about one of the push type, the polling type, and the half-push/half-polling type selected by the ticket controlling apparatus 130. The information about the module to be distributed may include information about at least one of, for example, an assembly, dependency files configuring an application program, and rights information.

The pushing unit 220 of the server 110 may distribute at least one module to at least one client 120 through a channel generated between the server 110 and the at least one client 120 by using the ticket controlling apparatus 130 based on the upgrade schedule of the pushing scheduling unit 230. The at least one module may include other modules than the module to be upgraded among all the modules distributed from the server 110 to the client 120, as well as the module to be upgraded. All the modules distributed from the server 110 to the client 120 may include the module to be upgraded and remaining modules except for the module to be upgraded.

The pushing scheduling unit 230 of the server 110 may receive, from the server interface unit 210, information relating to the upgrade which is provided by the ticket controlling apparatus 130. In addition, the pushing scheduling unit 230 may generate upgrade schedules for upgrading by at least one client 120 performed by the pushing unit 220 based on the information relating to the upgrade.

Figure 3:
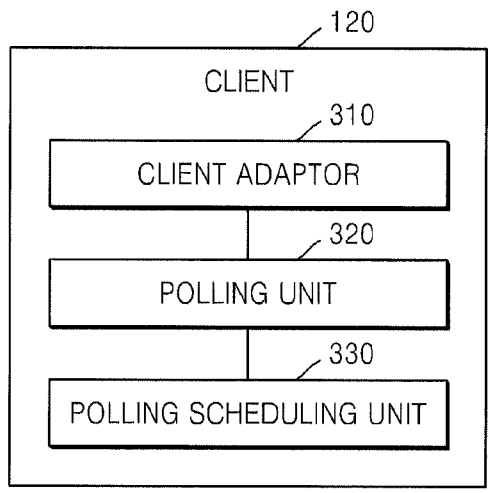
FIG. 3 is a block diagram showing a client of FIG. 1, according to an embodiment.

FIG. 3 is a block diagram showing the client 120 of FIG. 1, according to an embodiment.

The client 120, the upgrade type of which is adaptively changed, may include a client adaptor 310, a polling unit 320, and a polling scheduling unit 330. The client adaptor 310 controls connections to the server 110. The polling unit 320 may download a module from the server 110. The polling scheduling unit 330 is connected to the ticket controlling apparatus 130 including the ticket 420, and may receive information relating to the upgrade which is provided from the ticket controlling apparatus 130. In addition, the polling scheduling unit 330 may schedule the upgrade of the client 120 by using the polling unit 320 based on the received information about the upgrade. The ticket 420 may refer to a function list or a file list that may include information about the distribution strategy, information about the upgrade type, and the information about the module to be distributed.

The client adaptor 310 may connect to the server 110 so as to register information about the client 120 in the pushing unit 220 of the server 110. The information about the client 120 may include accessing information about accessing the client 120 and version information of the module included in the client 120. The connection between the server 110 and the client 120 may be managed in one-to-one correspondence, and all of the clients 120 may be registered in the pushing unit 220.

As described above, the information relating to the upgrade may include the information about the distribution strategy determined by the ticket controlling apparatus 130, the information about the upgrade type determined by the ticket controlling apparatus 130, and the information about the module to be distributed. The distribution strategy may include, for example, the broadcasting type, the staged type, and the time reservation time. The upgrade type may include, for example, the module distribution type including the pushing type, the polling type, and the half-push/half-poling type.

In addition, the information about the determined distribution strategy, the information about the determined upgrade type, and the information about the module to be distributed are as described above.

The polling unit 320 may receive information about the upgrade from the server interface unit 210 of the server 110. In addition, the polling unit 320 may download at least one module from the pushing unit 220 of the server 110 through the channel generated between the server 110 and the client 120 by the ticket controlling apparatus 130, based on the upgrade schedule of the polling scheduling unit 330. The at least one module may include other modules than the module to be upgraded among all the modules distributed from the server 110 to the client 120, as well as the module to be upgraded.

The polling scheduling unit 330 may generate an upgrade schedule for the upgrade of the client 120 performed by the polling unit 320 based on the received information about the upgrade.

Figure 4:
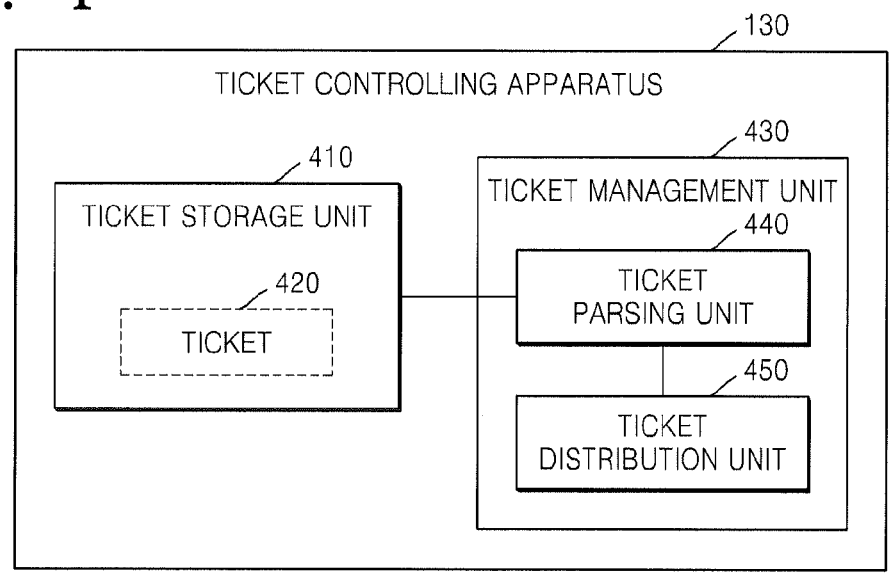
FIG. 4 is a block diagram showing a ticket controlling apparatus used between the server and the client to adaptively change the upgrade type, according to an embodiment.

FIG. 4 is a block diagram showing the ticket controlling apparatus 130 used between the server 110 and the client 120 in order to adaptively change the upgrade type, according to an embodiment.

The ticket controlling apparatus 130 used between the server 110 and the client 120 for adaptively changing the upgrade type may include a ticket storage unit 410 and a ticket management unit 430. The ticket storage unit 410 may include the ticket 420 having the information about the ticket. The ticket management unit 430 may analyze information about the ticket 420 stored in the ticket storage unit 410 and may form a channel between the server 110 and the client 120 based on the analyzed information. The ticket 420 may refer to the function list or the file list including the information about the distribution strategy, the information about the upgrade type, and the information about the module to be distributed. That is, the information about the ticket may denote each of the information about the distribution strategy, the information about the upgrade type, and the information about the module to be distributed.

The information about the distribution strategy, the information about the upgrade type, and the information about the module to be distributed are as described above.

The ticket management unit 430 may include a ticket parsing unit 440 and a ticket distribution unit 450. The ticket parsing unit 440 may analyze the information about the ticket 420. The ticket distribution unit 450 may determine information about the upgrade based on the analyzed information about the ticket 420, and may generate the channel between the server 110 and the client 120 based on the determined information about the upgrade.

Determination of the information relating to the upgrade based on the analyzed information about the ticket 420 may include selecting one of the distribution strategies and selecting one of the upgrade types.

Figure 5:
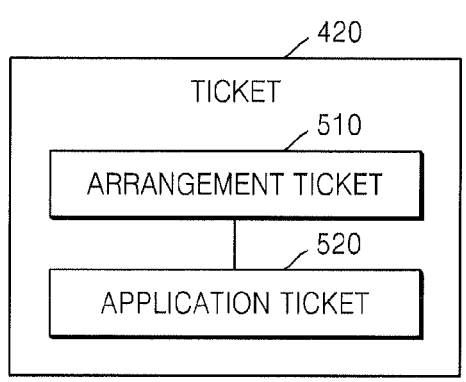
FIG. 5 is a block diagram showing a ticket stored in a ticket storing unit of the ticket controlling apparatus, according to an embodiment.

FIG. 5 is a block diagram showing the ticket 420 stored in the ticket storage unit 410 of the ticket controlling apparatus 130, according to an embodiment.

The ticket 420 may include an arrangement ticket 510 including the information about the distribution strategy and the information about the upgrade type, and an application ticket 520 including the information about the module to be distributed.

The information about the distribution strategy, the information about the upgrade type, and the information about the module to be distributed is described above.

Figure 6:
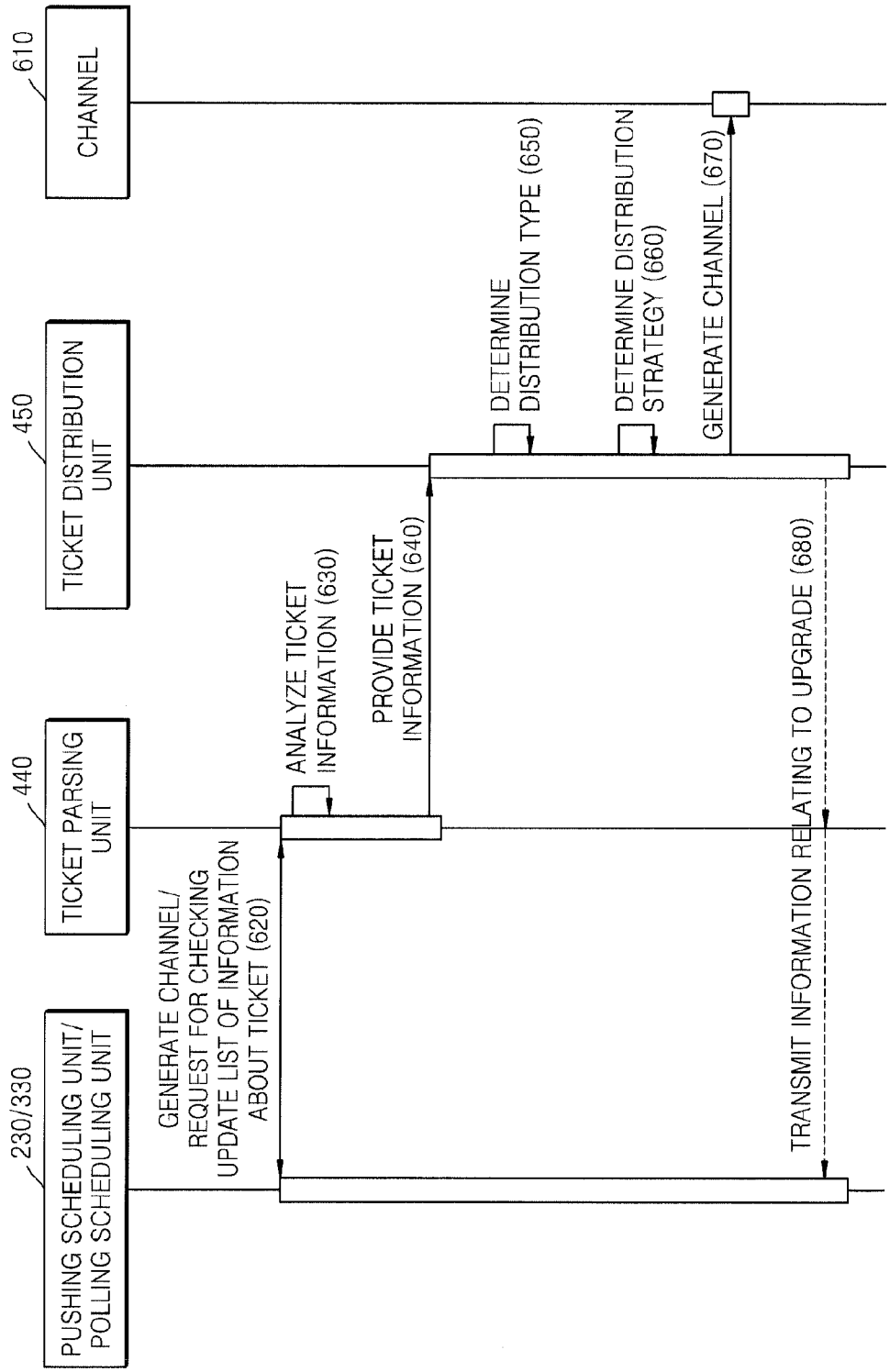
FIG. 6 is a diagram showing operations of the server, the client, and the ticket controlling apparatus, according to an embodiment.

FIG. 6 is a diagram illustrating operations of the server 110, the client 120, and the ticket controlling apparatus 130, according to an embodiment.

A channel between the pushing scheduling unit 230 of the server 110 or the polling scheduling unit 330 of the client 120 and the ticket controlling apparatus 130 may be generated, and a request for checking an information update list of the ticket 420 may be transmitted (620). The ticket parsing unit 440 of the ticket controlling apparatus 130 may analyze the information about the ticket 420 (630). The analyzed information about the ticket 420 may be provided to the ticket distribution unit 450 of the ticket controlling apparatus 130 (640). The ticket distribution unit 450 may determine the distribution type (650) and may determine the distribution strategy (660). The channel may be generated between the server 110 and the client 120 based on the determined distribution type and the distribution strategy (670). The information about the upgrade including information about the distribution type determined by the ticket distribution unit 450 and information about the determined distribution strategy may be transmitted to the server 110 or the client 120 (680). This will be described in more detail below with reference to FIGS. 7 through 10.

Figure 7:
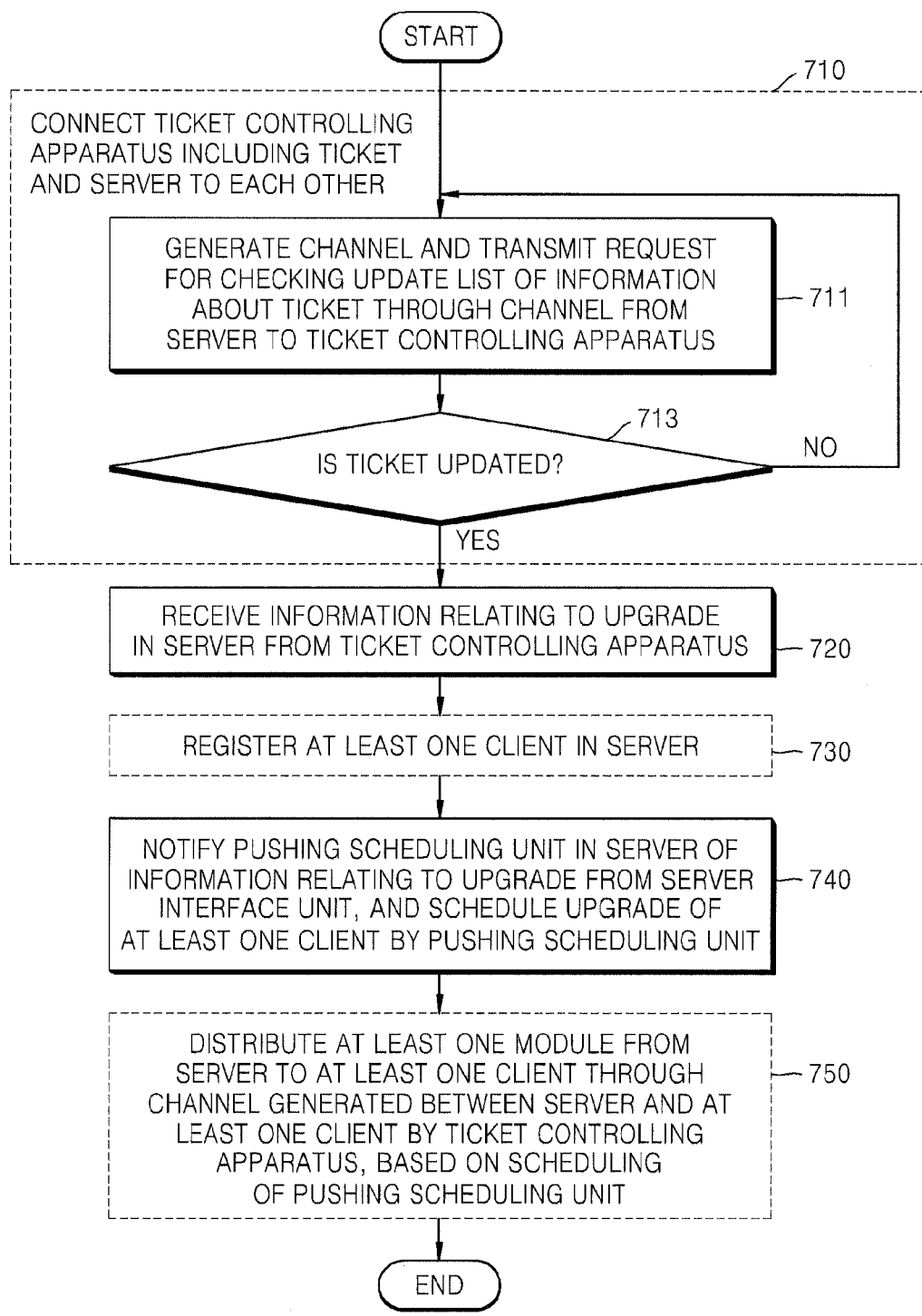
FIG. 7 is a flowchart illustrating a method of adaptively changing an upgrade type, according to an embodiment.

FIG. 7 is a flowchart illustrating a method of adaptively changing the upgrade type, according to an embodiment.

The method of adaptively changing the upgrade type, according to an embodiment, may include an operation of connecting the ticket controlling apparatus 130, which includes the ticket 420, to the server 110 (S710) and an operation of receiving the information about the upgrade by the server interface 210 of the server 110 from the ticket controlling apparatus 130 (S720). In addition, the method of adaptively changing the upgrade type may include an operation of registering at least one client 120 that is to be upgraded in the server 110 (S730). Also, the method of adaptively changing the upgrade type may include an operation of notifying the pushing scheduling unit 230 of the server 110 of the information relating to the upgrade received from the server interface unit 210 of the server 110, and scheduling the upgrade of the at least one client 120 in the pushing scheduling unit 230 of the server (S740). The ticket 420 may denote the function list or the file list including the information about the distribution strategy, the information about the upgrade type, and the information about the module to be distributed.

The information about the distribution strategy, the information about upgrade type, and the information about the module to be distributed is described above.

The operation of connecting the ticket controlling apparatus 130, which includes the ticket 420, to the server 110 (S710) may include an operation of generating the channel from the server 110 to the ticket controlling apparatus 130, and transmitting a request for checking the update list of the information about the ticket 420 through the channel (S711). In addition, the operation of connecting the ticket controlling apparatus 130, which includes the ticket 420, to the server 110 (S710) may include checking whether the ticket 420 is updated from the ticket controlling apparatus 130, and repeating the transmission of the request for checking the update list of the information about the ticket 420, if the ticket 420 is not updated (S713).

The information relating to the upgrade may include the information about the distribution strategy determined by the ticket controlling apparatus 130, the information about the upgrade type determined by the ticket controlling apparatus 130, and the information about the module to be distributed. The information about the distribution strategy, the information about the upgrade type, and the information about the module to be distributed is described above.

In addition, the method of adaptively changing the upgrade type may further include an operation of distributing at least one module from the pushing unit 220 of the server 110 to the polling unit 320 of the client 120 through the channel generated between the server 110 and the at least one client 120 generated by the ticket controlling apparatus 130, based on the upgrade schedule of the pushing scheduling unit 230 (S750). The at least one module may include other modules than the module to be upgraded among all the modules distributed from the server 110 to the client 120, as well as the module to be upgraded.

Figure 8:
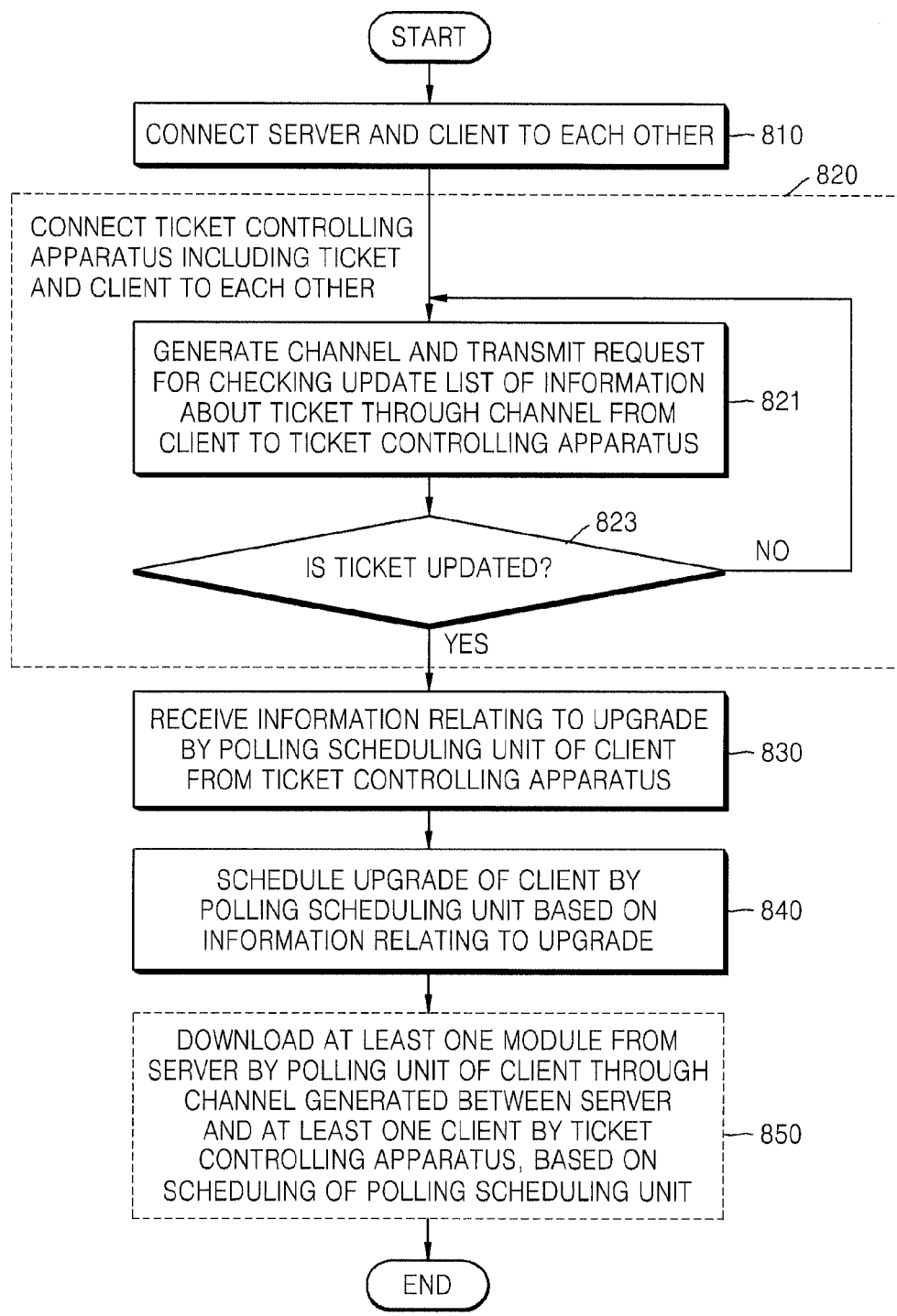
FIG. 8 is a flowchart illustrating a method of adaptively changing an upgrade type, according to another embodiment.

FIG. 8 is a flowchart illustrating a method of adaptively changing an upgrade type, according to an embodiment.

The method of adaptively changing the upgrade type, according to an embodiment, may include an operation of connecting the server 110 to the client 120 (S810) and an operation of connecting the client 120 and the ticket controlling apparatus 130, which includes the ticket 420, to each other (S820). In addition, the method of adaptively changing the upgrade type, according to the present embodiment, may include an operation of receiving the information about the upgrade by the polling scheduling unit 330 of the client 120 from the ticket controlling apparatus 130 (S830). In addition, the method of the present embodiment may also include an operation of generating the upgrade schedule of the client 120 by the polling scheduling unit 330 of the client 120 based on the received information about the upgrade (S840). The ticket 420 may denote the function list or the file list including the information about the distribution strategy, the information about the upgrade type, and the information about the module to be distributed. The information about the distribution strategy, the information about the upgrade type, and the information about the module to be distributed is described above.

The operation of connecting the server 110 and the client 120 to each other (S810) may include an operation of connecting to the server 110 by the client adaptor 310 of the client 120 to register information about the client 120 in the pushing unit 220 of the server 110.

The operation of connecting the client 120 and the ticket controlling apparatus 130 to each other may include an operation of generating a channel to the ticket controlling apparatus 130 by the polling scheduling unit 330 of the client 120 and transmitting a request for checking the update list of information about the ticket 420 through the channel (S821). In addition, the operation of connecting the client 120 and the ticket controlling apparatus 130 to each other may include an operation of checking whether the ticket 420 is updated from the ticket controlling apparatus 130, and if the ticket 420 is not updated, repeating the transmission of the request for checking the update list of the information about the ticket 420 (S823).

The information relating to the upgrade may include the information about the distribution strategy determined by the ticket controlling apparatus 130, the information about the upgrade type determined by the ticket controlling apparatus 130, and the information about the module to be distributed. The information about the distribution strategy, the information about the upgrade type, and the information about the module to be distributed is described above.

In addition, the method of adaptively changing the upgrade type, according to an embodiment, may include an operation of downloading at least one module from the server 110 by the polling unit 320 of the client 120 through the channel generated between the server 110 and the client 120 by the ticket controlling apparatus 130, based on the schedule of the polling scheduling unit 330 of the client 120 (S850). The at least one module may include other modules except for the module to be upgraded among all the modules distributed from the server 110 to the client 120, as well as the module to be upgraded.

Figure 9:
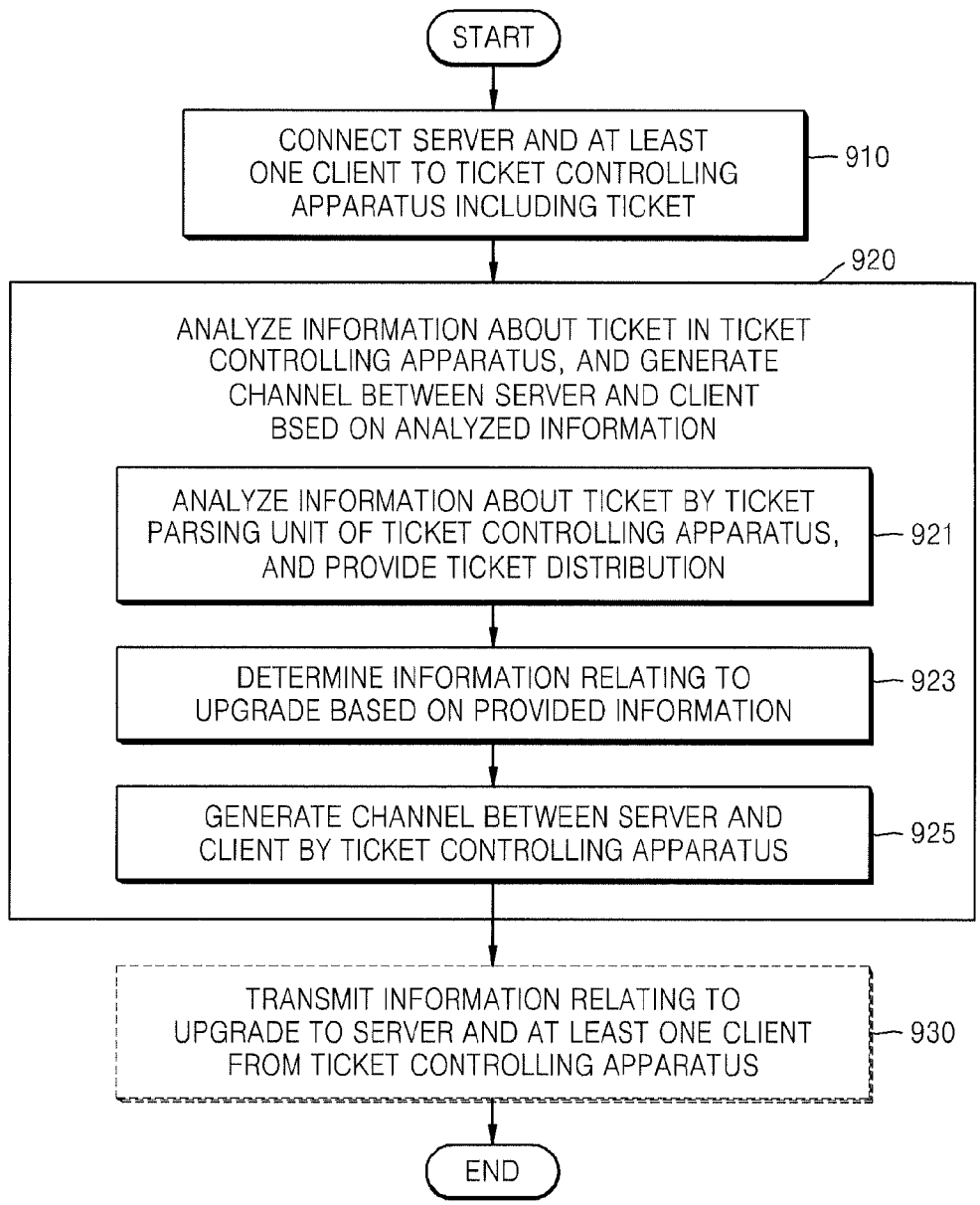
FIG. 9 is a flowchart illustrating a method of adaptively changing an upgrade type, according to another embodiment.

FIG. 9 is a flowchart illustrating a method of adaptively changing the upgrade type, according to an embodiment.

The method of adaptively changing the upgrade type, according to the present embodiment, may include an operation of connecting at least one of the server 110 and the client 120 and the ticket controlling apparatus 130, which includes the ticket 420, to each other (S910) and an operation of analyzing the information about the ticket 420 in the ticket controlling apparatus 130 and generating a channel between the server 110 and the client 120 based on the analyzed information (S920). The ticket 420 may refer to the function list or the file list including the information about the distribution strategy, the information about the upgrade type, and the information about the module to be distributed. In addition, the ticket 420 may include the arrangement ticket 510 including the information about the distribution strategy and the information about the upgrade type, and the application ticket 520 including the information about the module to be distributed.

The information about the distribution strategy, the information about the upgrade type, and the information about the module to be distributed is described above.

The operation of connecting the server 110 and at least one client 120 to the ticket controlling apparatus 130, which includes the ticket 420, (S910) may further include receiving the request for checking the update list of the information about the ticket 420 by the ticket parsing unit 440 of the ticket controlling apparatus 130 from the server 110 and the at least one client 120.

The operation S920 may further include an operation of analyzing the information about the ticket 420 in the ticket parsing unit 440 of the ticket controlling apparatus 130 and providing the analyzed information about the ticket 420 to the ticket distribution unit 450 of the ticket controlling apparatus 130 (S921), an operation of determining relating to the upgrade based on the analyzed information in the ticket distribution unit 450 of the ticket controlling apparatus 130 (S923), and an operation of generating the channel between the server 110 and the client 120 by the ticket controlling apparatus 130 (S925).

The operation of determining the information relating to the upgrade (S923) may include selecting one of the distribution strategies including the broadcasting type, the staged type, and the time reservation time, and selecting one of the upgrade types including the pushing type, the polling type, and the half-push/half-polling type.

In addition, the method of adaptively changing the upgrade type, according to the present embodiment, may further include an operation of transmitting the information relating to the upgrade from the ticket distribution unit 450 of the ticket controlling apparatus 130 to the server 110 and at least one client 120 (S930).

Figure 10:
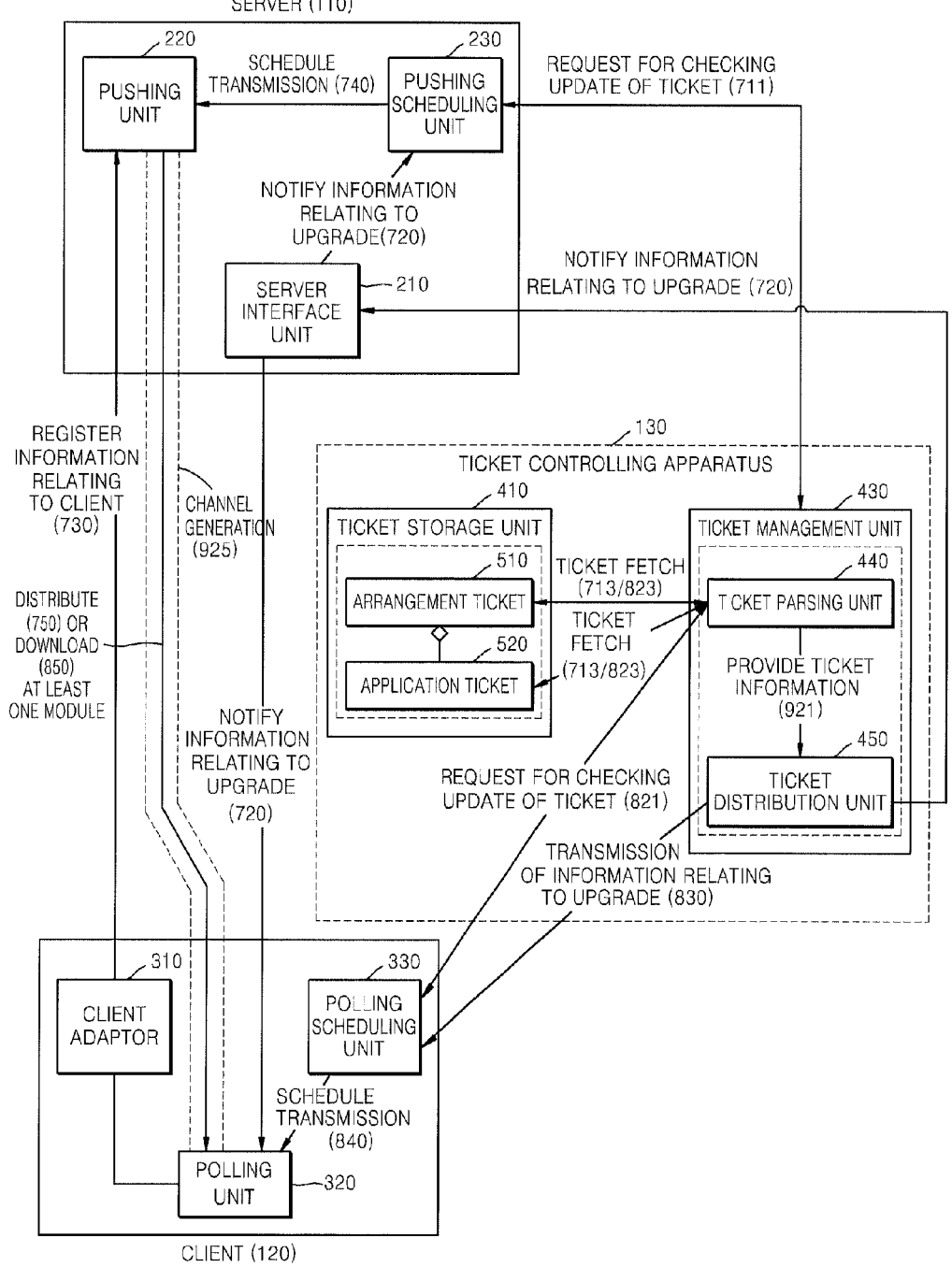
FIG. 10 is a diagram showing operations of the server, the client, and the ticket controlling apparatus, according to an embodiment.

FIG. 10 is a diagram showing operations of the server 110, the client 120, and the ticket controlling apparatus 130, according to an embodiment.

Operations shown in FIG. 10 may be described with the methods of adaptively changing the upgrade type shown in FIGS. 7 through 9 according to an embodiment.

The push type upgrade may be achieved through the following operations.

The pushing scheduling unit 230 of the server 110 may transmit a request for checking the update of the ticket to the ticket management unit 430 of the ticket controlling apparatus 130 (S711). The request for checking the update of the ticket 420 may include a request for checking the update list of the information about the ticket 420 (for example, the information about the distribution strategy, the information about the upgrade type, and the information about a module to be distributed). That is, the pushing scheduling unit 230 of the server 110 may transmit a request for checking whether the ticket 420 is updated. In the polling type upgrade, the polling scheduling unit 330 of the client 120 may transmit a request for checking the update of the ticket to the ticket management unit 430 of the ticket controlling apparatus 130 (S821).

The ticket parsing unit 440 of the ticket management unit 430 that receives the request for checking the update of the ticket may fetch the arrangement ticket 520 and the application ticket 520 stored in the ticket storage unit 410. Here, 'fetch' may mean a series of operations of invoking commands or data in order to execute the command or data stored in a storage unit, performed by a processor such as a central processing unit (CPU). The ticket parsing unit 440 may analyze the information of the fetched ticket 420 and may transmit a response to the request for checking the update of the information about the ticket to the pushing scheduling unit 230 of the server 110 or the polling scheduling unit 330 of the client 120. The ticket parsing unit 440 may provide the ticket distribution unit 450 of the ticket management unit 430 with the analyzed information about the ticket 420 (S921). The ticket distribution unit 450 may determine information relating to the upgrade based on the provided information and may generate a channel between the server 110 and the client 120 based on the determination (S925).

The server interface unit 210 of the server 110 may receive the information relating to the upgrade from the ticket distribution unit 450 (S720) and may notify the pushing scheduling unit 230 of the server 110 and the polling unit 320 of the client 120 of the received information. At least one client 120 may be registered in the server 110 (S730). This operation may be performed also in the polling type upgrade method. The pushing scheduling unit 230 of the server 110 may schedule the upgrade of the client 120 by using the pushing unit 220 based on the notification information (S740). That is, the pushing scheduling unit 230 may generate an upgrade schedule, in which the module is distributed from the pushing unit 220 to upgrade the client 120 for the client 120 to perform an upgrade.

At least one module may be distributed from the pushing unit 220 of the server 110 to the polling unit 320 of the client 120 through the channel generated between the server 110 and the client 120, based on the upgrade schedule of the pushing scheduling unit 230, and thus may achieve the upgrade of the client 120 (S750). The at least one module may include other modules except for the module to be upgraded among all the modules distributed from the server 110 to the client 120, as well as the module to be upgraded.

On the other hand, in a case of the polling type upgrade, the upgrade processes may be similarly performed to those of the pushing type upgrade. As described above, a request for checking the update of the ticket may be transmitted from the polling scheduling unit 330 of the client 120 to the ticket management unit 430 (S821), and the ticket distribution unit 450 may determine information relating to the upgrade based on the information about the ticket, which may be analyzed and provided by the ticket parsing unit 440. In addition, the channel may be generated between the server 110 and the client 120 based on the determination (S925). The polling scheduling unit 330 of the client 120 may receive the information relating to the upgrade from the ticket distribution unit 450 and may schedule the upgrade of the client 120 by using the polling unit 320 based on the received information (S840). That is, the polling scheduling unit 330 may generate the upgrade schedule according to which the polling unit 320 downloads the module from the pushing unit 220 of the server 110, for the client 120 to perform an upgrade.

At least one module may be downloaded from the pushing unit 220 of the server 110 to the polling unit 320 of the client 120 through the channel generated between the server 110 and the client 120, based on the upgrade schedule determined by the polling scheduling unit 330, and then, the upgrade of the client 120 may be performed (S850). The at least one module may include other modules except for the module to be upgraded among all the modules distributed from the server 110 to the client 120, as well as the module to be upgraded.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although example embodiments have been shown and described, it would be appreciated by those skilled in the art that changes may be made in these example embodiments without departing from the principles and spirit of the disclosure, which are defined in the following claims and their equivalents.

What is claimed is:

1. A client, an upgrade type of which is configured to be adaptively changed, comprising:
   a memory coupled to a processor;
   a client adaptor controlling a connection to a server;
   a polling unit downloading a module from the server; and
   a polling scheduling unit connecting to a ticket controlling apparatus, receiving from the ticket controlling apparatus information relating to an upgrade based on analyzed information about a ticket, and scheduling an upgrade of the client based on the received information relating to the upgrade,
   wherein the ticket comprises information about a distribution strategy, information about the upgrade type, and information about a module to be distributed,
   wherein the distribution strategy comprises one of a broadcasting type which distributes modules to all clients simultaneously, a staged type which distributes the modules to groups of clients, and a time reservation type which distributes the modules at reserved times,
   wherein the upgrade type comprises one of a push type upgrade, a polling type upgrade, and a half-push/half-polling type upgrade, and
   wherein the module to be distributed comprises information about at least one of an assembly, a plurality of dependency files configuring an application program, and a rights information.

2. The client of claim 1, wherein the client adaptor is configured to register information about the client in a pushing unit of the server.

3. The client of claim 1, wherein
   the information about the distribution strategy is determined by the ticket controlling apparatus, and the information about the upgrade type is determined by the ticket controlling apparatus, and
   the polling unit is configured to receive notification of the information relating to the upgrade from a server interface unit of the server, and to download at least one module from the pushing unit of the server through a channel generated between the server and the client by the ticket controlling apparatus.

4. The client of claim 1, wherein the at least one module comprises the module to be upgraded and at least one among a plurality of all modules that will be distributed from the server to the at least one client.

5. The client of claim 1, wherein the polling scheduling unit is configured to generate an upgrade schedule of the client based on the received ticket.

6. A method of adaptively changing an upgrade type in a client, the method comprising:
   connecting to a server;
   connecting to a ticket controlling apparatus;
   receiving from the ticket controlling apparatus information relating to an upgrade based on analyzed information about a ticket; and
   generating an upgrade schedule based on the ticket,
   wherein the ticket comprises information about a distribution strategy, information about the upgrade type, and information about a module to be distributed, and
   wherein the distribution strategy comprises one of a broadcasting type which distributes modules to all clients simultaneously, a staged type which distributes the modules to groups of clients, and a time reservation type which distributes the modules at reserved times,
   wherein the upgrade type comprises one of a push type upgrade, a polling type upgrade, and a half-push/half-polling type upgrade,
   wherein the module to be distributed comprises information about at least one of an assembly, a plurality of dependency files configuring an application program and a rights information.

7. The method of claim 6, wherein the connecting to the server comprises registering information about the client in the server.

8. The method of claim 6, wherein the connecting to the ticket controlling apparatus comprises:
   generating a channel from the at least one client to the ticket controlling apparatus, and transmitting a request for checking an update list of information about the ticket through the channel; and
   receiving a response indicating whether the ticket is updated from the ticket controlling apparatus, and repeating the transmission of the request for checking the update list of the information about the ticket when the received response indicates that the ticket is not updated.

9. The method of claim 6, wherein the information about the distribution strategy is determined by the ticket controlling apparatus, and the information about the upgrade type is determined by the ticket controlling apparatus.

10. The method of claim 6, further comprising downloading at least one module from the server by the client based on the upgrade schedule of the client.

11. The method of claim 10, wherein the at least one module comprises the module to be upgraded and at least one among a plurality of all modules that will be distributed from the server to the at least one client.

12. A method of adaptively changing an upgrade type in a ticket controlling apparatus, the method comprising:
    connecting to a server and at least one client;
    analyzing information about a ticket, and generating a channel between the server and the at least one client based on the analyzed information; and
    determining information relating to the upgrade based on the analyzed information,
    wherein the ticket comprises information about a distribution strategy, information about the upgrade type, and information about a module to be distributed, and
    wherein the distribution strategy comprises one of a broadcasting type which distributes modules to all clients simultaneously, a staged type which distributes the modules to groups of clients, and a time reservation type which distributes the modules at reserved times,
    wherein the upgrade type comprises one of a push type upgrade, a polling type upgrade, and a half-push/half-polling type upgrade,
    wherein the module to be distributed comprises information about at least one of an assembly, a plurality of dependency files configuring an application program, and a rights information.

13. The method of claim 12, wherein the connecting to the server and the at least one client comprises: receiving a request for checking an update list of the information about the ticket from the server and the at least one client by the ticket controlling apparatus.

14. The method of claim 12, wherein the ticket comprises:
    an arrangement ticket comprising the information about the distribution strategy and the information about the upgrade type; and
    an application ticket comprising the information about the module to be distributed.

15. The method of claim 12, wherein the analyzing of the information about the ticket comprises:
    analyzing the information about the ticket by a ticket parsing unit of the ticket controlling apparatus; and
    providing the analyzed information about the ticket to a ticket distribution unit of the ticket controlling apparatus.

16. The method of claim 15, wherein the generating of the channel between the server and the at least one client based on the analyzed information comprises determining information relating to an upgrade via the ticket distribution unit of the ticket controlling apparatus based on the analyzed information about the ticket.

17. The method of claim 16, wherein the determining of the information relating to the upgrade comprises: selecting the distribution strategy and selecting the upgrade type.

18. The method of claim 17, further comprising transmitting the information relating to the upgrade from the ticket controlling apparatus to the server and the at least one client.

* * * * *